Patented Dec. 4, 1928.

1,693,713

UNITED STATES PATENT OFFICE.

ALPHONS O. JAEGER, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE.

PURIFICATION OF CRUDE ANTHRACENE. REISSUED

No Drawing. Application filed January 16, 1928. Serial No. 247,260.

This invention relates to the purification of various grades of anthracene by processes which include solvent purification steps.

In the past crude anthracene has been purified by various solvent methods involving recrystallization or leaching. These methods have been based primarily on the use of solvents which possess greater solvent power for the impurities, such as phenanthrene and carbazol, than they do for anthracene, especially at lower temperatures. A number of solvents have been proposed. One class consists in solvents such as solvent naphtha which have a relatively high solvent power for phenanthrene with a lower solvent power for anthracene and carbazol. This type of solvents cannot be used alone to produce high grade anthracene because of their lack of sufficient solvent power for carbazol. Another class of solvents the pyridines, have achieved considerably greater success in the past. Pyridine possesses a high solvent power for carbazol and phenanthrene and low solvent power at low temperatures for anthracene and is the most successful solvent to be used in the past. Pyridines, however, are open to a number of very serious disadvantages. In the first place, their odor is extremely unpleasant, their price is very high, and it is difficult to obtain complete recovery of the solvent by simple means since pyridine is relatively soluble in water and steam distillation processes are therefore relatively unsuitable.

The present invention is based on the use of a new class of solvents, namely liquid compounds containing the furane nucleus.

These compounds possess extremely high solvent power for carbazol and phenanthrene and while capable of dissolving anthracene at elevated temperatures possess extremely low solvent power for anthracene at low temperatures. While the invention generally includes the use of all the liquid furane compounds, it has been found that some of the compounds are more advantageous than others. Thus, for example, furane itself has the serious disadvantage that it boils at about 32° C. which renders its use difficult unless great care is taken to prevent loss of solvent by evaporation. The homologues of furane, such as methyl furane, and especially dimethyl furane are much more satisfactory as they have a higher boiling point. Some of the esters of furoic acid pyromucic acid) such as the ethyl, propyl, butyl and amyl furoates may be used.

We have found, however, that the most effective and preferred furnace solvents are the aldehydes furfural and its homologues, such as methyl furfural. These products have extraordinarily satisfactory solvent powers, they are high-boiling liquids, and possess relatively very low solubility in water at low temperatures, permitting recovery of the last traces of solvent by distillation with superheated steam. Furfuryl alcohol has desirable solvent characteristics and is included in the present invention but labors under the disadvantage that it is miscible with water. The preferred furane solvents, such as the furfurals, possess so low a solubility for anthracene at low temperatures that it is possible to obtain by their use in a minimum number of recrystallizations, washings or leachings from 94–100% of the crude anthracene in the form of purified material of excellent properties. The furfurals are relatively cheap and available in enormous quantities, since they can be produced from corn cobs, oat hulls, and other waste products, and their relatively pleasant odor, high boiling point and relative insolubility in water render them almost ideal for the purification of anthracene. The pure furane compounds may be used or the technical grade, such as crude furfural, may be employed and are, of course, much cheaper.

By the use of furane solvents alone effective purifications of crude anthracene may be carried out. Thus, for example, when a crude anthracene, containing 31.1% anthracene, 15.8% carbazol and the remainder phenanthrene and dead oils, is recrystallized from furfural, either pure or technical, the resulting product contains 81.53% anthracene and 7.81% carbazol, the remainder being phenanthrene. The recovery of anthracene is about 96%. A second recrystallization from furfural produces a 94.35% anthracene, which contains 2.25% carbazol. The recovery of anthracene on this second recrystallization is almost 100%. The solvent power of furfural for anthracene is extremely low but when a material is treated containing large amounts of phenanthrene, apparantly the phenanthrene exerts a solvent action on the anthracene for the recovery of anthracene from the crude product in the first crystallization is considerably smaller than in the second.

While the use of furane solvents alone, such as the furfurals, effectively purifies crude anthrancene it is desirable in many cases to apply the process to a semi-refined anthracene with a lower phenanthrene content so as to avoid losses of anthracene due probably to solvent action of phenanthrene as described above and also to decrease the amount of furane solvent required. Such semi-refined anthracene, containing 57–62% anthracene, 32–35% carbazol, with the remainder phenanthrene, can be obtained by treatment of crude anthracene with phenanthrene solvents, such as benzol, toluol, solvent naphtha, gasoline, orthodichlorbenzol and other chlorinated products, such as the residue from the chlorine purification of light oil and the like. The preliminary refining may be effected either by a recrystallization process or by a washing or leaching process. The semi-refined anthracene when subjected to recrystallization from crude or refined furfurals using a minimum amount of solvent at 80° C. followed by cooling yields a purified anthracene containing 95–97% anthracene which is well suited for producing dye stuffs. This shows clearly the excellent carbazol solvent powers of furane solvents and especially furfurals. The cake obtained after distilling off the furfural mother liquor can be purified by treatment with sulfuric acid with or without the presence of a solvent inert toward the acid which will eliminate any traces of anthracene present. On dilution an almost chemically pure carbazol can be obtained.

Instead of combining the furane solvent treatment with other solvent treatments, it may be combined with the vapor phase catalytic purification of anthracene in the presence of catalysts which favor the total combustion of carbazol. Mixtures of solvents may also be used, particularly mixtures of furane solvents with the solvents for phenanthrene described above and the mixtures are very important in some cases as some of the phenanthrene solvents, such as, for example, benzol, toluol, solvent naphtha, and particularly the chlorinated solvents, such as arthodichlorbenzol, are extremely cheap. When such mixed solvents are used, the furane solvents, especially when furfurals are used, preferentially dissolve the carbazol whereas the other components of the solvent dissolve the phenanthrene.

When crude anthracene is directly purified with furfural and the furfural distilled off, a cake results which contains phenanthrene and carbazol. This may be purified catalytically or may be subjected to any suitable treatment to separate the phenanthrene and carbazol. For example, it may be subjected to fusions with caustic potash with or without additions of caustic soda, either in an ordinary fusion or in the presence of indifferent diluents, such as kerosene and other hydrocarbons, both alifatic and aromatic.

Although some of the furane solvents, such as furfurals, are relatively cheap when compared to the other solvents, such as pyridine, they are nevertheless sufficiently costly and make the high recovery of the solvent economically desirable. The main losses when using high boiling furane solvents result from the solvent which is retained in the cakes in anthracene or phenanthrene and carbazol, From these cakes the solvent may be removed by washing with other solvents. Particularly in the case of furfurals which show a relatively small solubility for water, the cakes may be blown with superheated steam or with any other vapors which tend to form with the solvent azeotropic mixtures. Other suitable methods of solvent recovery may, of course, be used.

In the above description the action of the furane solvents have been described as if they acted purely as indifferent solvents. It is probable that for the most part this may be the case but the tremendous solubility of carbazol and also of phenanthrene in the furane solvents, particularly furfurals, may be due to the formation of loose chemical compounds with the solvent and it should be understood that the invention is not limited to any theories of solvent action.

The invention will be described in greater detail in connection with the following specific examples which illustrate the application of the invention.

*Example 1.*

100 parts by weight of crude anthracene containing 31.1% anthracene, 15.8% carbazol, and the remainder phenanthrene and dead oils, are stirred in 400–500 parts by weight of furfural, methyl furfural, or a mixture of the two, and the mixture is heated up to 80° C. and then allowed to cool to 15–20° C. Anthracene crystallizes out and after separating from the mother liquor and drying the recrystallized product constitutes 39.5 parts by weight and analyzes 81.53% anthracene, 7.18% carbazol and the remainder phenanthrene. It will appear, therefore, that more than 95% of the crude anthracene is recovered. The furfural can be distilled off from the mother liquor which contains phenanthrene and carbazol and further recovered from the anthracene cake by blowing steam therethrough. Recoveries up to 97.5% are possible and may be increased up to 99% by blowing superheated steam through the phenanthrene cake also.

The phenanthrene-carbazol cake obtained after recovery of furfural can also be treated with or without the presence of solvent naphtha or other indifferent solvents with KOH or a mixture or KOH and NaOH at a temperature of 150–250° C. Alkali metal carbazol forms and can be separated from the phenanthrene resulting in the recovery of a high grade carbazol and a high grade phenanthrene. Instead of using caustic potash fusion, the phenanthrene-carbazol mixture may be submitted to the action of solvents, such as solvent naphtha, benzol, orthodichlorbenzol and other chlorinated solvents which have a high solvent power for phenanthrene or do not readily dissolve carbazol.

Instead of recovering phenanthrene, carbazol and furfural from the crude cake, the latter may be uniformly vaporized with air and catalytically oxidized to products such as phthalic anhydride, maleic acid, mesotartaric acid and the like. In this oxidation reaction, both phenanthrene and the furfural are effectively used and in some cases a considerable amount of carbazol may also be transferred into usable intermediate oxidation products which will usually include maleic acid.

Instead of using furfurals in the above example, other furane solvents, such as dimethyl furane or furfuryl alcohol, may be used but the furfurals give better results and are considerably cheaper.

Example 2.

Anthracene recrystallized from furfural as described in Example 1 is subjected to a second crystallization from furfural using 3–4 parts of furfural to one part of anthracene and heated up to 80° C. followed by cooling to 15–20° C. The product obtained contains 94.35% anthracene and 2.25% carbazol. The recovery of anthracene is practically quantitive.

Example 3.

Centrifuged crude anthracene, containing 26.09% anthracene, 15.25% carbazol and the remainder phenanthrene and dead oils, is recrystallized from a minimum amount of toluol which will dissolve the crude anthracene at 80° C. A recrystallized anthracene is obtained which contains 56.71% of anthracene and 26.64% of carbazol, the remainder being phenanthrene. 100 parts of this recrystallized anthracene are put on a filter and gradually washed with 2½–3 times the amount of technical furfural. A high grade anthracene containing 94% anthracene and 3.2% carbazol is obtained, the remainder being probably phenanthrene. This anthracene is only slightly colored.

Example 4.

Various grades of crude anthracene are treated with benzol, toluol, solvent naphtha, acetone, gasoline, orthodichlorbenzol, or other chlorinated solvents for phenanthrene. The treatment is continued until substantially all of the phenanthrene is removed.

It is possible to obtain in this way an anthracene containing 63.8% anthracene and 36.2% carbazol. This crude anthracene is then recrystallized from furfural using the minimum amount of furfural necessary to dissolve the mixture at 80° C., followed by cooling down to 15° C. An anthracene is obtained which contains 97.76% anthracene and 2.24% carbazol. The mother liquor can be distilled off and a carbazol cake remains which contains only traces of anthracene which can be readily removed by treatment with 98% sulfuric acid at 20–25° C., with or without the presence of inert solvents followed by dilution with water which results in the precipitation of carbazol which is 99.6% pure.

Example 5.

Crude anthracene containing about 30.2% anthracene, 22.1% carbazol and 47.4% phenanthrene and dead oils is submitted to a catalytic purification by means of selective oxidation of undesired impurities. A catalyst composition may be used containing cobalt oxide, copper oxide, or ferric oxide, singly or in admixture, stabilized with KOH or $KNO_3$ and coated onto pumice fragments. The contact mass may be produced by dissolving 70 parts of cobalt nitrate with 6 parts of water in 200 volumes of water and precipitated with 10 N.KOH solution, followed by filtration and suspension in 250 parts of water containing 8–10 parts of 100% KOH or an equivalent amount of $KNO_3$. The suspension is coated onto 200 parts by volume of pea size pumice fragments and heated in a current of air at 350–400° C. The crude anthracene described above is uniformly vaporized in air in proportion of 1 part crude anthracene by weight to 25–35 parts of air and then passed over the contact mass, at 380° C. A purified anthracene is obtained which contains 75.34% anthracene and 0.96% carbazol, the remainder being mainly phenanthrene. This material is then recrystallized from the minimum amount of furfural needed to dissolve the mass at 80° C. and is then washed or leached with furfural. After this treatment, the product analyzes 99.2% anthracene, the remainder being phenanthrene.

*Example 6.*

Anthracene is purified using a less effective catalyst which will burn out the dead oils and some of the phenanthrene and carbazol. Such a contact mass may contain 16 parts of $Fe_2O_3$ and 35 parts of $KNO_3$ coated on to 200 volumes of pea size pumice fragments. When a crude anthracene containing 26-30% anthracene and 18-22% carbazol is uniformly vaporized with air in the ratio of 1:35 to 1:50 by weight and passed over the contact mass at 380-400° C. a purified anthracene is obtained which contains 60.3% anthracene and 6.4% carbazol, the remainder being phenanthrene. This purified anthracene is then submitted to recrystallization from furfural using 250 parts of furfural to 83 parts of anthracene. After recrystallization, the anthracene obtained contains 93.04% anthracene and 2.42% carbazol with the remainder phenanthrene. The recovery of anthracene is from 93-95% of the anthracene contained in the material subjected to recrystallization. A very high grade phenanthrene can be recovered from the mother liquor.

I claim:

1. A method of purifying impure anthracene, which comprises subjecting it to the selective solvent action of a solvent containing at least one liquid compound containing the furane nucleus.

2. A method of purifying impure anthracene, which comprises subjecting it to recrystallization from a solvent containing at least one liquid compound containing the furane nucleus.

3. A method of purifying impure anthracene, which comprises subjecting it to the selective solvent action of a solvent containing at least one furfural.

4. A method of purifying impure anthracene, which comprises subjecting it to recrystallization from a solvent containing at least one furfural.

5. A method of purifying crude anthracenes containing as their main impurities carbazol and phenanthrene in a two-step process, one of the steps comprising subjecting the material to the selective solvent action of a liquid compound containing a furane nucleus and the other step comprising the subjection of the material to the selective solvent action of a solvent which dissolves phenanthrene readily but which has small solvent power for carbazol and anthracene.

6. A method according to claim 5, in which the crude anthracene is first subjected to treatment with the phenanthrene solvent and the purified anthracene from this step is then subjected to the action of a solvent containing a furane nucleus.

7. A method according to claim 5, in which the crude anthracene is first subjected to treatment with the phenanthrene solvent and the purified anthracene from this step is then subjected to the action of a solvent containing a furfural.

8. A method of purifying crude anthracene containing as impurities phenanthrene and carbazol, which comprises subjecting it to the selective solvent action of a furfural solvent, whereby the phenanthrene and carbazol is brought into solution and the anthracene is recovered in the form of a cake and recovering the furfural from the cake by steam distillation.

9. A method of purifying crude anthracene containing as impurities phenanthrene and carbazol, which comprises subjecting it to the selective solvent action of a furfural solvent, whereby the phenanthrene and carbazol are brought into solution and the anthracene is recovered in the form of a cake and recovering the furfural from the cake by displacement with another solvent.

10. A method of purifying crude anthracene, which comprises subjecting it to the action of a mixed solvent containing a furane nucleus and a solvent having specific solvent power for phenanthrene.

11. A method of purifying crude anthracene, which comprises subjecting it to the action of a mixed solvent containing furfural and a solvent having specific solvent power for phenanthrene.

12. A method of purifying an impure anthracene which comprises dissolving it at a temperature between room temperature and the boiling point of the solvent in a minimum amount of a solvent containing furane nucleus and cooling the solution to a temperature not greater than room temperature and separating the anthracene which crystallizes out from the mother liquor.

13. A method of purifying an impure anthracene, which comprises dissolving it at a temperature between room temperature and the boiling point of the solvent in a minimum amount of furfural and cooling the solution to a temperature not greater than room temperature and separating the anthracene which crystallizes out from the mother liquor.

14. A method of recovering pure anthracene and phenanthrene from crude anthracene which comprises subjecting the crude anthracene to the selective solvent action of a solvent containing a furane nucleus whereby phenanthrene and carbazol or separated from the anthracene, recovering the phenanthrene and carbazol from the solvent and subjecting the mixture to a caustic alkali fusion treatment followed by vaporization of the phenanthrene.

Signed at Pittsburgh, Penna., this 13th day of January, 1928.

ALPHONS O. JAEGER.